US012669060B2

(12) United States Patent
Turner et al.

(10) Patent No.: US 12,669,060 B2
(45) Date of Patent: Jun. 30, 2026

(54) AIRFOIL ROTOR HUB SYSTEM HAVING INTENTIONAL FREQUENCY MISTUNING

(71) Applicant: General Electric Company, Schenectady, NY (US)

(72) Inventors: Kevin E. Turner, Liberty Township, OH (US); Yoon Seok Choi, Kenwood, OH (US); Cem Tutcu, Istanbul (TR); Keegan Nathaniel Mehrtens, Peabody, MA (US); Ramakrishna Mallina, Mason, OH (US); Robert Bruce Dickman, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 25 days.

(21) Appl. No.: 18/596,318

(22) Filed: Mar. 5, 2024

(65) Prior Publication Data

US 2025/0283410 A1 Sep. 11, 2025

(51) Int. Cl.
*F01D 5/10* (2006.01)
*F01D 5/16* (2006.01)

(52) U.S. Cl.
CPC ................. *F01D 5/10* (2013.01); *F01D 5/16* (2013.01); *F05D 2250/11* (2013.01); *F05D 2250/183* (2013.01); *F05D 2260/961* (2013.01)

(58) Field of Classification Search
CPC .......... F01D 5/10; F01D 5/16; F05D 2260/96; F05D 2260/961
See application file for complete search history.

(56) References Cited

U.S. PATENT DOCUMENTS

| | | | |
|---|---|---|---|
| 2,582,107 A | 1/1952 | Dakin | |
| 6,428,278 B1 | 8/2002 | Montgomery et al. | |
| 7,147,437 B2 | 12/2006 | Burdgick et al. | |
| 7,500,299 B2 * | 3/2009 | Dupeux | F01D 25/04 702/56 |

(Continued)

FOREIGN PATENT DOCUMENTS

| | | |
|---|---|---|
| EP | 3428391 A1 | 1/2019 |
| EP | 2942481 B1 | 3/2019 |

(Continued)

OTHER PUBLICATIONS

Choi et al., "Analysis of Structural Mistuning Effects on Bladed Disc Vibrations Including Aerodynamic Damping," International Compressor Engineering Conference, School of Mechanical Engineering, Paper 1627 (2004).

*Primary Examiner* — Courtney D Heinle
*Assistant Examiner* — Cameron A Corday
(74) *Attorney, Agent, or Firm* — McCarter & English, LLP

(57) ABSTRACT

An airfoil rotor hub system including a rotor hub, the rotor hub having a variable radius around a circumference of the rotor hub, and a plurality of airfoils connected to the rotor hub, a first airfoil in the plurality of airfoils having a first span connected to a surface of the rotor hub at a first radius, and a second airfoil in the plurality of airfoils having a second span connected to the surface of the rotor hub at a second radius. The first radius is different from the second radius, and the first span of the first airfoil is different from the second span of the second airfoil so as to mistune a frequency of the first airfoil and the second airfoil to reduce or substantially to eliminate flutter in the plurality of airfoils.

12 Claims, 7 Drawing Sheets

(56) References Cited

U.S. PATENT DOCUMENTS

| | | | |
|---|---|---|---|
| 8,157,504 | B2 | 4/2012 | Amaral et al. |
| 8,876,472 | B2 | 11/2014 | Dijoud et al. |
| 8,967,974 | B2 | 3/2015 | Garcia-Crespo |
| 9,097,125 | B2 | 8/2015 | Ghorbani Zarimahalleh et al. |
| 9,382,916 | B2 | 7/2016 | Schoenenborn |
| 9,429,026 | B2 | 8/2016 | Schreiber |
| 9,683,447 | B2 | 6/2017 | Gentile et al. |
| 10,066,502 | B2 | 9/2018 | Anderson |
| 10,156,244 | B2 | 12/2018 | Fulayter et al. |
| 10,267,155 | B2 | 4/2019 | Montes Parra |
| 10,302,100 | B2 * | 5/2019 | Xu .......................... F01D 5/143 |
| 10,371,162 | B2 | 8/2019 | Eleftheriou et al. |
| 10,415,391 | B2 | 9/2019 | Duong et al. |
| 10,584,591 | B2 | 3/2020 | Opoka et al. |
| 10,808,541 | B2 | 10/2020 | Bales et al. |
| 10,837,287 | B2 | 11/2020 | Abrari |
| 10,837,459 | B2 | 11/2020 | Veitch et al. |
| 10,844,722 | B2 | 11/2020 | Montes Parra |
| 10,851,655 | B2 | 12/2020 | Gonzalez-Gutierrez |
| 10,865,807 | B2 | 12/2020 | Theratil et al. |
| 10,876,409 | B2 | 12/2020 | Nolcheff et al. |
| 10,954,804 | B2 | 3/2021 | McComb et al. |
| 10,995,768 | B2 | 5/2021 | Johann |
| 11,002,293 | B2 * | 5/2021 | Anand ...................... F01D 5/16 |
| 11,047,397 | B2 | 6/2021 | Hayford et al. |
| 11,220,913 | B2 | 1/2022 | Molnar, Jr. |
| 11,255,199 | B2 | 2/2022 | Burney et al. |
| 11,371,357 | B2 | 6/2022 | De Gaillard et al. |
| 11,608,753 | B2 | 3/2023 | Senoo et al. |
| 2013/0236325 | A1 | 9/2013 | Duong et al. |
| 2014/0301852 | A1 * | 10/2014 | Zscherp ................ F04D 29/324 29/889.71 |
| 2019/0120061 | A1 * | 4/2019 | Horn ....................... F01D 5/141 |
| 2023/0235680 | A1 | 7/2023 | Andreoli et al. |
| 2023/0358140 | A1 | 11/2023 | Ren et al. |
| 2024/0035385 | A1 * | 2/2024 | Phouratsamay .......... F01D 5/16 |

FOREIGN PATENT DOCUMENTS

| | | | |
|---|---|---|---|
| EP | 3368748 | B1 | 9/2019 |
| EP | 3208467 | B1 | 3/2021 |
| EP | 3075955 | B1 | 6/2021 |
| EP | 3102792 | B1 | 9/2021 |
| EP | 2896791 | B1 | 12/2021 |

* cited by examiner

AIRFOIL ROTOR HUB SYSTEM HAVING INTENTIONAL FREQUENCY MISTUNING

TECHNICAL FIELD

The present disclosure relates generally to rotor blade systems and, in particular, to an airfoil rotor hub system having a variable airfoil hub radius for intentional frequency mistuning for use in turbine engines.

BACKGROUND

Gas turbine engines generally include a fan and a turbo-engine arranged in flow communication with one another with the core disposed downstream of the fan in the direction of flow through the gas turbine engine.

BRIEF DESCRIPTION OF THE DRAWINGS

Features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
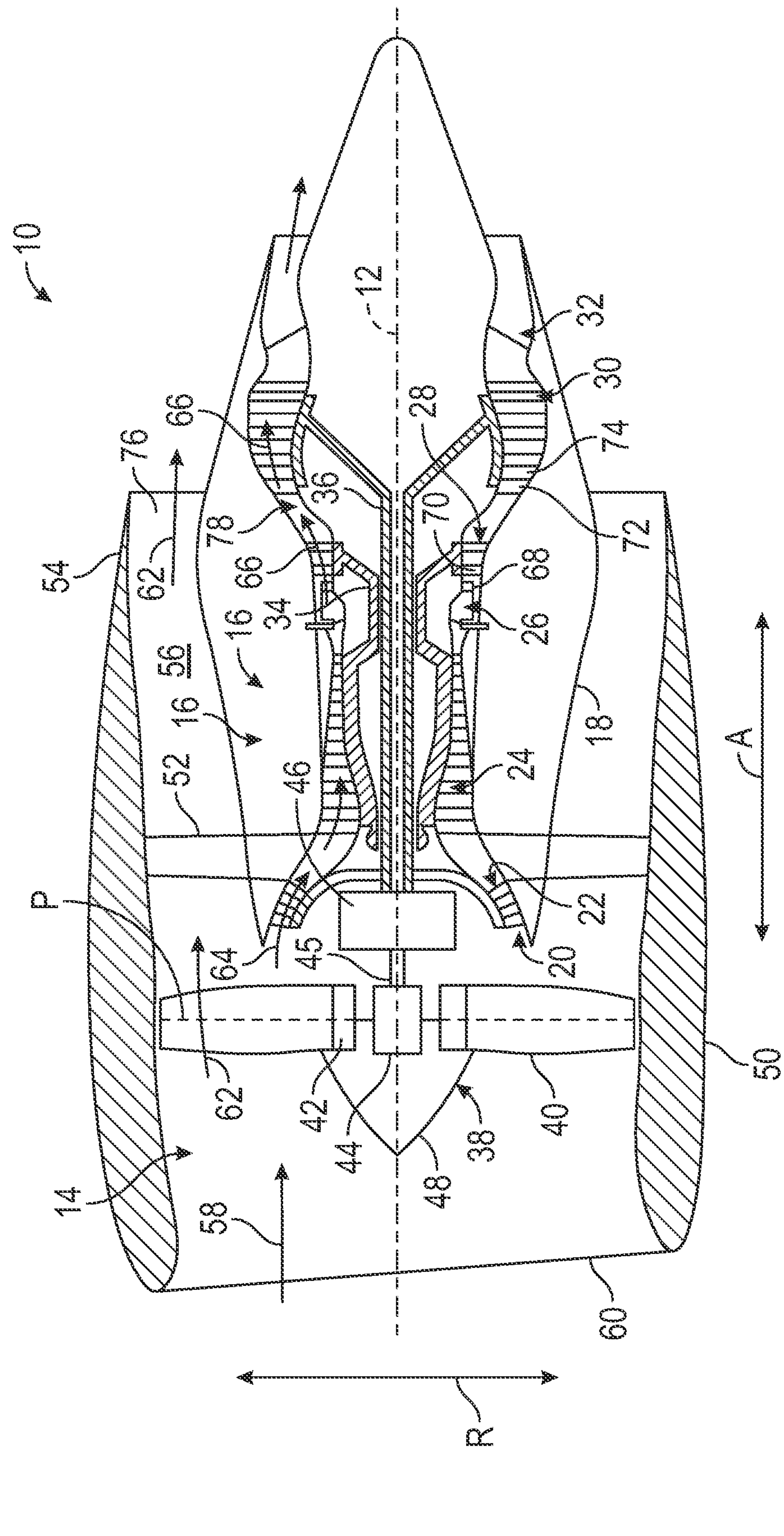
FIG. 1 is a schematic cross-sectional diagram of a turbine engine, according to an embodiment of the present disclosure.

Features, advantages, and embodiments of the present disclosure are set forth or apparent from consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine or the combustor. Moreover, the terms "radial" and "radially" refer to directions and orientations that extend substantially perpendicular to the centerline of the turbine engine or the fuel-air mixer assembly. In addition, as used herein, the terms "circumferential" and "circumferentially" refer to directions and orientations that extend arcuately about the centerline of the turbine engine or the fuel-air mixer assembly.

A gas turbine engine generally includes a fan and a turbo-engine arranged in flow communication with one another with the turbo-engine disposed downstream of the fan in the direction of flow through the gas turbine engine. The turbo-engine of the gas turbine engine generally includes, in serial flow order, a compressor section, a combustion section, a turbine section, and an exhaust section. With multi-shaft gas turbine engines, the compressor section can include a high pressure compressor (HPC) disposed downstream of a low pressure compressor (LPC), and the turbine section can similarly include a low pressure turbine (LPT) disposed downstream of a high pressure turbine (HPT). With such a configuration, the HPC is coupled with the HPT via a high pressure shaft (HPS), and the LPC is coupled with the LPT via a low pressure shaft (LPS).

In operation, at least a portion of air over the fan is provided to an inlet of the core. Such a portion of the air is progressively compressed by the LPC and then by the HPC until the compressed air reaches the combustion section. Fuel is mixed with the compressed air and burned within the combustion section to produce combustion gases. The combustion gases are routed from the combustion section through the HPT and then through the LPT. The flow of combustion gases through the turbine section drives the HPT and the LPT, each of which in turn drives a respective one of the HPC and the LPC via the HPS and the LPS. The combustion gases are then routed through the exhaust section, e.g., to atmosphere.

The LPT drives the LPS, which drives the LPC. In addition to driving the LPC, the LPS can drive the fan through a power gearbox, which allows the fan to be rotated at fewer revolutions per unit of time than the rotational speed of the LPS for greater efficiency.

Various sections of the gas turbine engine including the HPC, LPC, HPT and LPT include rotors and a plurality of blades coupled to the rotors. The current trend in gas turbine engine design is to achieve a greater AN2. AN2 is parameter that is equal to the product of the annulus mid-area along the rotor blade (A) and the blade rotational speed squared (N2). A higher AN2 value indicates larger turbine blades and power output. However, a larger turbine blade coupled with a relatively high rotational speed can introduce rotor instability including flutter. Therefore, ways to control rotor instability are needed. Conventional ways to control this instability exist but are limited to only specific rotor and blade configurations and cannot be applied in every circumstance or may be cumbersome. For example, conventional techniques use spacing between airfoils or inclusion of cavities within the airfoils as ways to control the instability.

Embodiments of the present disclosure seek to provide a way to intentionally mistune the airfoils (e.g., blades) so as to passively control flutter. Embodiments of the present disclosure seek to frequency mistune airfoils by providing a variable rotor hub radius to prevent flutter of the airfoils. Intentional or purposeful airfoil (e.g., blade) frequency variation around a blade row around a circumference of the rotor hub can result in lower susceptibility to various types of non-synchronous vibration, including flutter. By varying a radius of the rotor hub, a span of the airfoil can be varied to introduce frequency variation in lower order modes, such as first flex (1F), second flex (2F) and first torsional (1T). These modes can be particularly susceptible to non-synchronous vibration. The variation of the span of the airfoil is achieved by modifying the rotor hub radius. Because airfoil span can have an effect on lower order mode frequencies, the amount of hub radius change can be minimal. As a result, variation of the hub does not negatively impact the overall weight or performance of the airfoil.

By varying the radius of the rotor hub, the natural frequency of the airfoil can be altered in a desired fashion, for example, in a patterned fashion around the circumference of the rotor hub to reduce or substantially eliminate flutter. For a turbofan engine, this technique can be effective in the fan, the booster, the HPC, the HPT, and the LPT. The vibrational phenomena are most prevalent in low-order airfoil modes such as 1F, 2F and 1T.

Flutter is the self-excited vibration of airfoils due to the interaction of structural-dynamic and aerodynamic forces. Flutter can lead to high-cycle fatigue (HCF) in the airfoil or even airfoil loss. Phase differences between the airfoils when the airfoils are vibrating can generate flutter. For example, if the airfoils are identical, the aeroelastic modes (coupled structural and aerodynamic system) are patterns of airfoil vibration with a constant phase angle between adjacent airfoils. Each aeroelastic mode has a different inter-airfoil phase angle. The inter-airfoil phase angle affects the phase between the local unsteady fluid flow through the airfoil and local airfoil motion that in turn affects the unsteady aerodynamic work done on the airfoil. Adverse phase angles can lead to positive work being performed on the airfoils that results in flutter. Flutter normally occurs at a natural frequency of an airfoil and can produce sustained blade vibration.

Frequency mistuning of an airfoil works by fundamentally breaking a coherence between the motion of the airfoil and the unsteady pressure field to eliminate or to reduce destabilizing frequency modes by altering the natural frequencies of adjacent airfoils in a given airfoil row around a circumference of the rotor hub and thus substantially eliminating or reducing flutter.

A challenge is how to induce frequency mistuning of airfoils without negatively impacting the aero performance, the balance behavior of the rotor, or other characteristics of the turbomachinery. The proposed frequency mistuning by varying the radius of the hub allows inducing a significant mistuning effect with minimal geometry changes. Primary modes for flutter are 1F, 2F and 1T, which have frequencies that are strongly impacted by the height (or the span) of the airfoil. Commonly used flat plate theory shows that the natural frequencies of the flexural modes change with:

$$1/(s^2),$$

and torsion modes change with:

$$1/s,$$

where s is the airfoil span. Therefore, a minimal variation in the airfoil span can lead to a change of the natural frequencies of the airfoil.

By reducing or eliminating flutter, this enables, for example, the airfoil to provide optimal propulsive efficiency, and, thus, an increase in turbine engine operating envelope and enables turbine engine operation in distorted environments. Distortion here refers to non-uniform flow coming into the blade row. Non-uniformity in the flow can exist in the radial profile, circumferential profile and/or in time (i.e., unsteadiness). Environment is referring to any condition that might induce flow distortion. Examples include, but not limited to, crosswind conditions, aircraft angle of attack, flow separations, flow turbulence, and vortex ingestion.

FIG. 1 is a schematic cross-sectional diagram of a turbine engine 10, according to an embodiment of the present disclosure. As shown in FIG. 1, the turbine engine 10 defines an axial direction A (extending parallel to a longitudinal centerline axis 12 provided for reference) and a radial direction R that is normal to the axial direction A. In general, the turbine engine 10 includes a fan section 14 and a turbo-engine 16 disposed downstream from the fan section 14.

The turbo-engine 16 depicted generally includes an outer casing 18 that is substantially tubular and defines an annular inlet 20. As schematically shown in FIG. 1, the outer casing 18 encases, in serial flow relationship, a compressor section including a booster or a low pressure (LP) compressor 22 followed downstream by a high pressure (HP) compressor 24, a combustion section 26, a turbine section including a high pressure (HP) turbine 28 followed downstream by a low pressure (LP) turbine 30, and a jet exhaust nozzle section 32. A high pressure (HP) shaft or a spool 34 drivingly connects the HP turbine 28 to the HP compressor 24 to rotate the HP turbine 28 and the HP compressor in unison. A low pressure (LP) shaft 36 drivingly connects the LP turbine 30 to the LP compressor 22 to rotate the LP turbine 30 and the LP compressor 22 in unison. The compressor section, the combustion section 26, the turbine section, and the jet exhaust nozzle section 32 together define a core air flowpath.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline axis 12 via a fan shaft 45 that is powered by the LP shaft 36 across a power gearbox 46. The power gearbox 46 includes a plurality of gears for adjusting the rotational speed of the fan shaft 45 and, thus, the fan 38 relative to the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. In addition, the fan section 14 includes an annular fan casing or a nacelle 50 that circumferentially surrounds the fan 38 and/or at least a portion of the turbo-engine 16. The nacelle 50 is supported relative to the turbo-engine 16 by a plurality of circumferentially spaced outlet guide vanes 52. Moreover, a downstream section 54 of the nacelle 50 extends over an outer portion of the turbo-engine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of the air 58 as indicated by arrow 62 is directed or routed into the bypass airflow passage 56, and a second portion of the air 58 as indicated by arrow 64 is directed or routed into the upstream section of the core air flowpath, or, more specifically, into the annular inlet 20 of the LP compressor 22. The ratio between the first portion of air 62 and the second portion of air 64 is commonly known as a bypass ratio. The pressure of the second portion of air 64 is then increased as it is routed through the HP compressor 24 and into the combustion section 26, where the highly pressurized air is mixed with fuel and burned to provide combustion gases 66.

The combustion gases 66 are routed into the HP turbine 28 and expanded through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus, causing the HP shaft or the spool 34 to rotate, thereby, supporting operation of the HP compressor 24. The combustion gases 66 are then routed into the LP turbine 30 and expanded through the LP turbine 30. Here, a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate. This thereby supports operation of the LP compressor 22 and rotation of the fan 38 via the power gearbox 46.

The combustion gases 66 are subsequently routed through the jet exhaust nozzle section 32 of the turbo-engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the turbo-engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable gas turbine engine.

Figure 2:
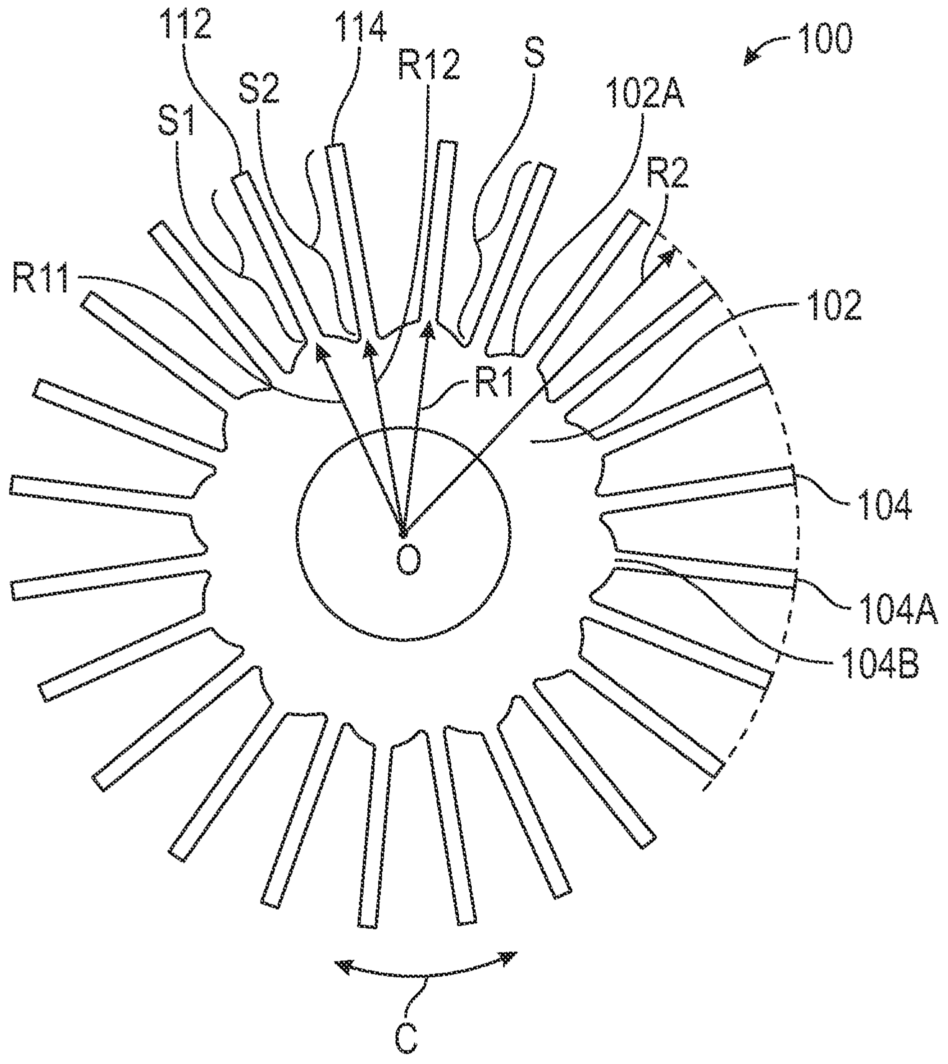
FIG. 2 is a schematic diagram of a front view an airfoil rotor hub system having a rotor hub and a plurality of airfoils (e.g., blades) connected thereto, according to an embodiment of the present disclosure.

FIG. 2 is a schematic diagram of a front view of an airfoil rotor hub system 100 having a rotor hub 102 and a plurality of airfoils 104 (e.g., blades) connected thereto, according to an embodiment of the present disclosure. The airfoil rotor hub system 100 has a plurality of airfoils 104 connected to a surface 102A of the rotor hub 102. The plurality of airfoils 104 have a base 104B connected to the surface 102A and a tip 104A extending therefrom by a span S. In an embodiment, a radius R1 of the rotor hub 102 varies along the circumference C of the rotor hub 102.

As shown in FIG. 2, a radius R2 of the airfoil rotor hub system 100 defined as a distance between axis of rotation O and a tip 104A of the airfoil 104 is substantially constant around a circumference C of the of the rotor hub 102. The axis of rotation O can be the same as the axial direction A (shown in FIG. 1). The radius R2 of the airfoil rotor hub system 100 is equal to a sum of the radius R1 of the rotor hub 102 and a span S of the plurality of airfoils 104 (R2=R1+S). In this embodiment, the radius R1 of the rotor hub 102 increases and decreases in an alternating fashion around the circumference C of the rotor hub 102. For example, as illustrated in FIG. 2, the surface 102A of the rotor hub 102 has a zigzagged sinusoidal shape or a triangular shape. A first airfoil 112 is connected to a peak of the triangular shape of the surface 102A and a second airfoil 114 adjacent the first airfoil 112 is connected to a trough of the triangular shape of the surface 102A. The first airfoil 112 has a first span S1 and the second airfoil 114 has a second span S2. The first span S1 of the first airfoil 112 is less than the second span S2 of the second airfoil 114.

Although the surface 102A of the rotor hub 102 is shown as having a zigzagged sinusoidal shape or a triangular shape, the surface 102A of the rotor hub 102 can also have other shapes such as a rounded scalloped shape, a trapezoid shape, etc. The main feature is to provide the surface 102A of the rotor hub 102 with a varying radius R1 and connecting two of the first airfoil 112 and the second airfoil 114 to two locations along the surface 102A having different radii. For example, the first airfoil 112 is connected to the surface 102A of the rotor hub 102 at a first radius R11 and the second airfoil 114 is connected to the surface 102A of the rotor hub 102 at a second radius R12, the second radius R12 being less than the first radius R11.

Figure 3:
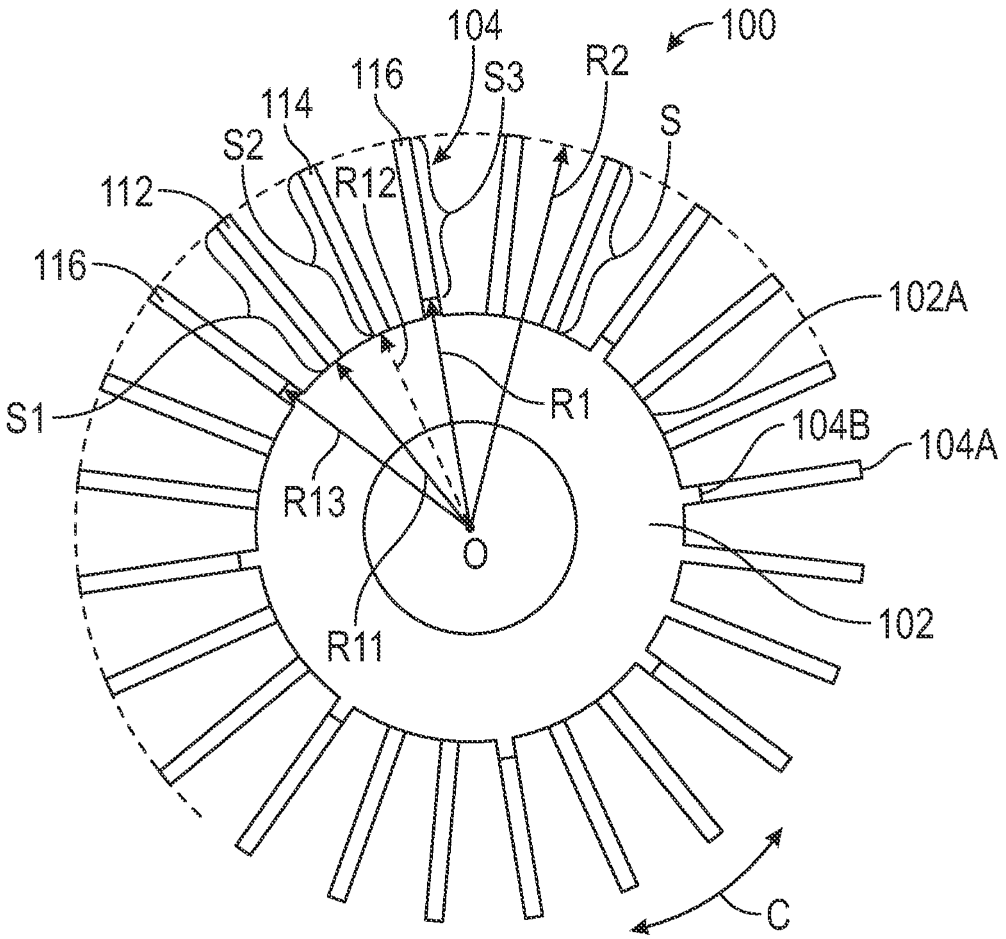
FIG. 3 is a schematic diagram of a front view an airfoil rotor hub system having a rotor hub and a plurality of airfoils (e.g., blades) connected thereto, according to another embodiment of the present disclosure.

FIG. 3 is a schematic diagram of a front view an airfoil rotor hub system 100 having a rotor hub 102 and a plurality of airfoils 104 (e.g., blades) connected thereto, according to another embodiment of the present disclosure. As shown in FIG. 2, the first airfoil 112 and the second airfoil 114 that are adjacent to each other have different spans S1 and S2. However, in another embodiment, shown in FIG. 3, the first airfoil 112 and the second airfoil 114 that are adjacent to each other can have substantially equal spans S1 and S2 and yet a third airfoil 116 adjacent to the first airfoil 112 or the second airfoil 114 can have a third span S3 different from the first span S1 and the second span S2.

As shown in FIG. 3, a radius R2 of the airfoil rotor hub system 100 defined as a distance between axis of rotation O and a tip 104A of the airfoil 104 is substantially constant around a circumference C of the of the rotor hub 102. The axis of rotation O can be the same as the axial direction A (shown in FIG. 1). The radius R2 of the airfoil rotor hub system 100 is equal to a sum of the radius R1 of the rotor hub 102 and a span S (i.e., S1, S2 or S3) of the plurality of airfoils 104 (R2=R1+S). In this embodiment, the radius R1 of the rotor hub 102 increases and decreases in an alternating fashion around the circumference C of the rotor hub 102. For example, as illustrated in FIG. 3, the surface 102A of the rotor hub 102 has a variable rectangular shape. The first airfoil 112 is connected to a trough of the variable rectangular shape of the surface 102A. The second airfoil 114 adjacent the first airfoil 112 is also connected to a trough of the variable rectangular shape of the surface 102A. A third airfoil 116 is connected to a peak of the of the variable rectangular surface 102A. The first airfoil 112 has a first span S1, the second airfoil 114 has a second span S2, and the third airfoil has a third span S3. The first span S1 of the first airfoil 112 and the second span S2 of the second airfoil 114 are less than the third span S3 of the second airfoil 116.

The first airfoil 112 is connected to the surface 102A of the rotor hub 102 at a first radius R11, the second airfoil 114 is connected to the surface 102A of the rotor hub 102 at a second radius R12, and the third airfoil 116 is connected to the surface 102A of the rotor hub 102 at a third radius R13. The third radius R13 is greater than both the first radius R11 and the second radius R12.

In yet another embodiment, a first group of one or more successive airfoils can have a same first span and a second group of one or more other airfoils can have a same second span. The second group of one or more successive airfoils can be provided adjacent the first group of one or more successive airfoils. The first span is different from the second span.

Figure 4:
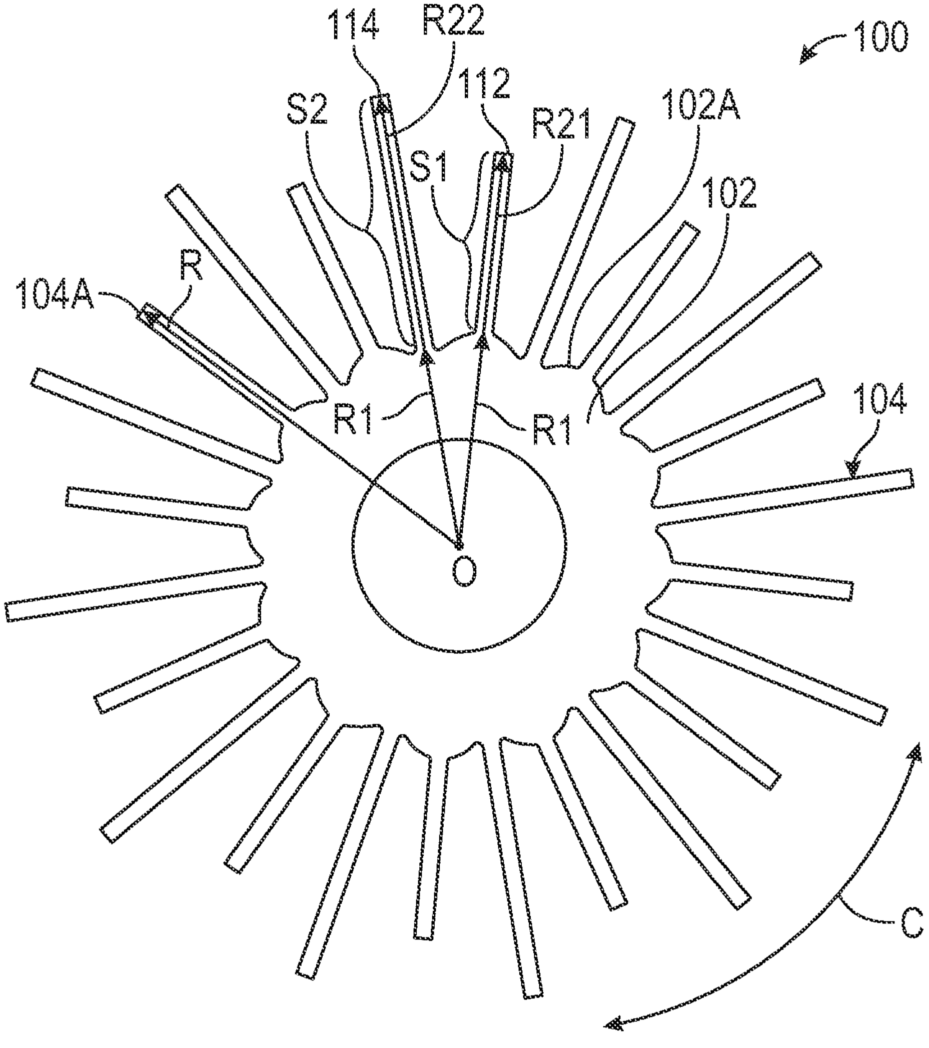
FIG. 4 is a schematic diagram of a front view an airfoil rotor hub system having a rotor hub and a plurality of airfoils (e.g., blades) connected thereto, according to yet another embodiment of the present disclosure.

FIG. 4 is a schematic diagram of a front view an airfoil rotor hub system 100 having a rotor hub 102 and a plurality of airfoils 104 (e.g., blades) connected thereto, according to yet another embodiment of the present disclosure. In the embodiment shown in FIG. 4, the first airfoil 112 having the first span S1 and the second airfoil 114 having the second span S2 have different spans. As shown in FIG. 4, the first span S1 is less than the second span S2. In addition, contrary to the airfoil rotor hub system 100 shown in FIG. 2, the airfoil rotor hub system 100 shown in FIG. 4, has a radius R, defined as a distance between a rotation axis O and a tip 104A of the airfoil 104, that is not constant and varies around a circumference C of the rotor hub 102. For example, a radius R21, corresponding to a sum of the radius R1 of the rotor hub 102 and the first span S1 of the first airfoil 112, is less than a radius R22, corresponding to a sum of the radius R1 of the rotor hub 102 and the second span S2 of the first airfoil 112.

In an embodiment, as illustrated in FIG. 2 and FIG. 4, the plurality of airfoils 104 can be equally spaced circumferentially around the circumference C of rotor hub 102. However, in another embodiment, the plurality of airfoils 104 may also be unequally spaced circumferentially around the circumference C of the rotor hub 102.

The plurality of airfoils 104 rotate with the rotation of the rotor hub 102. The tip 104A of each of the plurality of airfoils 104 rotates with the rotation of the rotor hub 102.

By varying the radius R1 of the rotor hub 102 on which the plurality of airfoils 104 are connected, the natural frequency of each of the plurality of airfoils 104 can be altered in a desired fashion, for example, in a patterned fashion around the plurality of airfoils 104 distributed around the circumference C of the rotor hub 102 to reduce or even substantially to eliminate flutter. The term "substantially eliminate flutter" is used herein to mean to substantially increase flutter margin of the overall blade row by greater than or equal to one percent (1%). Mistuning can also be used to reduce flutter magnitude. For a turbofan engine, this technique can be effective in the fan, the booster, the HPC and the LPT. The vibrational phenomena are most prevalent in low-order airfoil modes such as 1F, 2F and 1T.

Flutter is the self-excited vibration of airfoils due to the interaction of structural-dynamic and aerodynamic forces. Flutter can lead to high-cycle fatigue (HCF) in the airfoil or even airfoil loss. Phase differences between the airfoils when the airfoils are vibrating can generate flutter. For example, if the airfoils are identical, the aeroelastic modes (coupled structural and aerodynamic system) are patterns of airfoil vibration with a constant phase angle between adjacent airfoils. Each aeroelastic mode has a different inter-airfoil phase angle. The inter-blade phase angle affects the phase between the local unsteady fluid flow through the airfoil and local airfoil motion that in turn affects the unsteady aerodynamic work done on the airfoil. Adverse phase angles can lead to positive work being performed on the airfoils, which results in flutter. Flutter normally occurs at a natural frequency of an airfoil and can produce sustained blade vibration.

Frequency mistuning of an airfoil works by fundamentally breaking a coherence between the motion of the airfoil and the unsteady pressure field to eliminate or to reduce destabilizing frequency modes by altering the natural frequencies of adjacent airfoils in a given airfoil row and thus eliminating or reducing flutter. The term "frequency" is used herein to mean natural frequency, which is the frequency at which the airfoil or plurality of airfoils vibrates without driving or damping forces. In an embodiment, the plurality of airfoils 104 can have the same design and can be machined at different heights or radial lengths. In another embodiment, the plurality of airfoils 104 can also be redesigned such that the tips 104A of the plurality of airfoils 104 can have different shapes or designs.

Figures 5A, 5B:
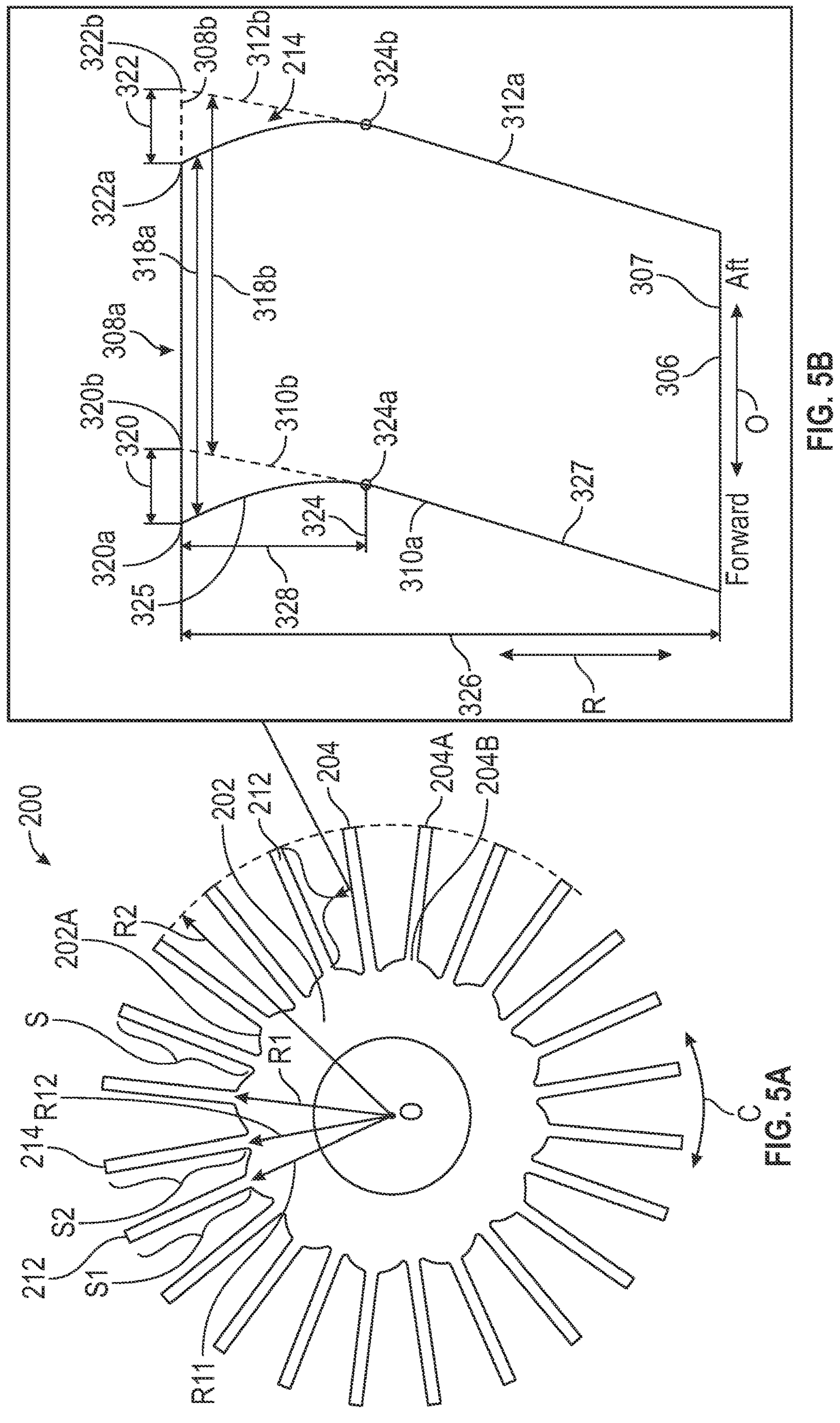
FIG. 5A is a schematic diagram of a front view an airfoil rotor hub system having a rotor hub and a plurality of airfoils (e.g., blades) connected thereto, at least one of the plurality of airfoils having an axial airfoil sweep, according to an embodiment of the present disclosure.
FIG. 5B is a schematic zoomed in tip portion of a first airfoil having the axial airfoil sweep of a leading edge of the first airfoil and a trailing edge of the first airfoil, according to an embodiment of the present disclosure.

FIG. 5A is a schematic diagram of a front view an airfoil rotor hub system 200 having a rotor hub 202 and a plurality of airfoils 204 (e.g., blades) connected thereto, according to an embodiment of the present disclosure. The airfoil rotor hub system 200 has a plurality of airfoils 204 connected to surface 202A of the rotor hub 202. The plurality of airfoils 204 have a base 204B connected to the surface 202A and a tip 204A extending therefrom by a span S. In an embodiment, a radius R1 of the rotor hub 202 varies along the circumference C of the rotor hub 202.

As shown in FIG. 5A, a radius R2 of the airfoil rotor hub system 200 defined as a distance between the axis of rotation O (axial direction O) and a tip 204A of the airfoil 204 is substantially constant around a circumference C of the of the rotor hub 202. The radius R2 of the airfoil rotor hub system 200 is equal to a sum of the radius R1 of the rotor hub 202 and a span S of the plurality of airfoils 204 (R2=R1+S). In this embodiment, the radius R1 of the rotor hub 202 increases and decreases in an alternating fashion around the circumference C of the rotor hub 202. For example, as illustrated in FIG. 5A, the surface 202A of the rotor hub 102 has a zigzagged sinusoidal shape or a triangular shape. A first airfoil 212 is connected to a peak of the triangular shape or sinusoidal shape of the surface 202A and a second airfoil 214 adjacent the first airfoil 212 is connected to a trough of the sinusoidal shape or the triangular shape of the surface 202A. The first airfoil 212 has a first span S1 and the second airfoil 214 has a second span S2. The first span S1 of the first airfoil 212 is less than the second span S2 of the second airfoil 214.

Although the surface 202A of the rotor hub 202 is shown as having a zigzagged sinusoidal shape or a triangular shape, the surface 202A of the rotor hub 202 can also have other shapes such as a rounded scalloped shape, a trapezoid shape, etc. The main feature is to provide the surface 202A of the rotor hub 202 with a varying radius R1 and connecting two of the first airfoil 212 and the second airfoil 214 to two locations along the surface 202A having different radii. For example, the first airfoil 212 is connected to the surface 202A of the rotor hub 202 at a first radius R11 and the second airfoil 214 is connected to the surface 202A of the rotor hub 202 at a second radius R12, the second radius R12 being less than the first radius R11.

In an embodiment, the first airfoil 212 that is connected to a peak of the triangular shape or sinusoidal shape of the surface 202A and having the first span S1 has an axial airfoil sweep of a leading edge of the first airfoil 212 and a trailing edge of the first airfoil 212 in a direction parallel to the axis of rotation O (e.g., axial direction A, shown in FIG. 1).

FIG. 5B is a schematic zoomed in tip portion of the first airfoil 212 having the axial airfoil sweep of the leading edge of the first airfoil 212 and the trailing edge of the first airfoil 212 in a direction parallel to the axis of rotation O (e.g., axial direction A shown in FIG. 1), according to an embodiment of the present disclosure. As described in more detail below, the axial airfoil sweep is defined as an axial change of at least a portion of the leading edge or trailing edge with respect to a leading edge or a trailing edge of a base airfoil (e.g., the second airfoil 214 shown in FIG. 5A), respectively. The axial airfoil sweep results in at least a portion of a leading edge or a trailing edge of the first airfoil (shown in FIG. 5A) being located farther forward or farther aft as compared to the base airfoil (e.g., the second airfoil 214 shown in FIG. 5A). In the embodiments described herein, the axial sweep occurs over a portion of the span S of the first airfoil 212. That is, the base airfoil (e.g., the second airfoil 214) is substantially linear with respect to a lower portion of the leading edge or trailing edge and the swept blade is nonlinear with respect to the leading edge or trailing edge above the lower portion.

As shown in FIG. 5B, the first airfoil 212 has an airfoil tip 308*a*, an airfoil root 306, a leading edge 310*a*, and a trailing edge 312*a*. A chord length 318*a* of the first airfoil 212 is defined between the leading edge 310*a* and the trailing edge 312*a* at the airfoil tip 308*a*. As shown in FIG. 5B, the chord length 318*a* may not be a linear measurement due to the curvature of the first airfoil 212 in the vicinity of the airfoil tip 308*a*. As illustrated in FIG. 5B, the airfoil tip 308*a* of the leading edge 310*a* is swept in the axial direction O (shown in FIG. 5A and FIG. 5B) toward the forward end of the turbine engine 10 (FIG. 1). The axial direction or axis of rotation O (shown in FIGS. 5A and 5B) can be the same as the axial direction A (shown in FIG. 1). The axial sweep is in relation to a base airfoil. The second airfoil 214 (base airfoil) has a base airfoil leading edge 310*b*, a base airfoil trailing edge 312*b*, a base airfoil tip 308*b*, and a base airfoil root 307. The base airfoil tip 308*b* and the airfoil tip 308*a* are coplanar. The base airfoil root 307 and the airfoil root 306 are coplanar. At the airfoil root 306, the leading edge and the trailing edge of each of the first airfoil 212 and the second airfoil 214 (the base airfoil) are at the same axial location and there is no axial sweep at the airfoil root 306 or the base airfoil root 307.

FIG. 5B illustrates the leading edge 310*a* substantially collinear with respect to the base airfoil leading edge 310*b* of the second airfoil 214 (base airfoil) along a lower portion 327 of the leading edge 310*a* that extends from the airfoil root 306 to a sweep point 324*a*. After the sweep point 324*a*, along an upper portion 325 of the leading edge 310*a*, the leading edge 310*a* is not collinear with respect to the base airfoil leading edge 310*b*. Thus, the sweep point 324*a* defines a point at which the leading edge 310*a* diverges from the base airfoil leading edge 310*b*. Likewise, the trailing edge 312*a* is substantially collinear with respect to the base airfoil trailing edge 312*b* along a lower portion of the trailing edge 312*a* that extends from the airfoil root 306 to a sweep point 324*b*. After the sweep point 324*b* and extending from the sweep point 324*b* to the airfoil tip 308*a*, the trailing edge 312*a* is not collinear with respect to the base airfoil trailing edge 312*b*. Thus, the sweep point 324*b* defines a point at which the trailing edge 312*a* diverges from the base airfoil trailing edge 312*b*.

As mentioned, the leading edge 310*a* is swept in the axial direction O (e.g., axial direction A) toward the forward end of the turbine engine 10 (FIG. 1). "Axial sweep" means that the leading edge 310*a* is axially farther in the forward direction than the base airfoil leading edge 310*b*. As noted above, the axial sweep of the leading edge 310*a* occurs from the sweep point 324*a* to the airfoil tip 308*a*. Likewise, the trailing edge 312*a* is swept in the axial direction O (e.g., axial direction A) toward the forward end of the turbine engine 10 (FIG. 1) as compared to the base airfoil trailing edge 312*b*. The axial sweep of the trailing edge 312*a* occurs from the sweep point 324*b* to the airfoil tip 308*a*. The sweep of the leading edge 310*a* and the trailing edge 312*a*, is such that the chord length 318*a* defined between the leading edge 310*a* and the trailing edge 312*a* is maintained constant with respect to a base airfoil chord length 318*b* of the second airfoil 214 (the base airfoil). A constant chord length 318*a* is a chord length that is within ten percent (either greater or lesser) of the base airfoil chord length 318*b* defined between the base airfoil leading edge 310*b* and the base airfoil trailing edge 312*b*. In some examples, the chord length 318*a* is equal to the base airfoil chord length 318*b*. By maintaining a constant chord length 318*a*, the first airfoil 212 performs about the same amount (e.g., within ten percent) of work as the second airfoil 214 (base airfoil), while benefiting from the mistuning properties that disrupt vibrational modes.

At the airfoil tip 308*a*, the amount that the leading edge 310*a* is swept in the axial direction A is equal to a leading edge axial chord sweep 320. The leading edge axial chord sweep 320 is defined between a leading tip edge 320*a* and a base airfoil leading tip edge 320*b*. The leading tip edge 320*a* is a substantially circumferentially extending edge of the airfoil tip 308*a* at the leading edge 310*a* and the base airfoil leading tip edge 320*b* is a circumferentially extending edge of the base airfoil tip 308*b* at the base airfoil leading edge 310*b*. By "substantially circumferentially" it is meant that the edge extends more in the circumferential direction than in either of the radial or axial directions. Similarly, at the airfoil tip 308*a*, the amount that the trailing edge 312*a* is swept in the axial direction O (e.g., axial direction A) is equal to a trailing edge axial chord sweep 322. The trailing edge axial chord sweep 322 is defined between a trailing tip edge 322*a* and a base airfoil trailing tip edge 322*b*. The trailing tip edge 322*a* is a substantially circumferentially extending edge of the airfoil tip 308*a* at the trailing edge 312*a* and the base airfoil trailing tip edge 322*b* is a circumferentially extending edge of the base airfoil tip 308*b* at the base airfoil trailing edge 312*b*.

The leading edge axial chord sweep 320 and the trailing edge axial chord sweep 322 may increase from the sweep points 324*a*, 324*b* to the airfoil tip 308*a*. That is, the distance between the leading edge 310*a* and the base airfoil leading edge 310*b* may increase from the sweep point 324*a* to the airfoil tip 308*a*. Likewise with the trailing edge axial chord sweep 322. In some examples, the leading edge axial chord sweep 320 and the trailing edge axial chord sweep 322 are equal. In some examples, the leading edge axial chord sweep 320 and the trailing edge axial chord sweep 322 are different, while maintaining the chord length 318*a* within ten percent of the base airfoil chord length 318*b*. The leading edge axial chord sweep 320 is from greater than zero percent to fifteen percent of the chord length 318*a*, and, preferably, from five percent to ten percent of the chord length 318*a*. The trailing edge axial chord sweep 322 is from greater than zero percent to fifteen percent of the chord length 318*a*, preferably, from five percent to ten percent of the chord length 318*a*.

A span length 326 is defined between the airfoil tip 308*a* and the airfoil root 306. The axial sweep of the leading edge 310*a* and the trailing edge 312*a* may extend from an axis 324 to the airfoil tip 308*a*. The axis 324 extends through the sweep point 324*a* (e.g., the point at which the leading edge 310*a* and the trailing edge 312*a* are no longer swept and are collinear with, respectively, the base airfoil leading edge 310*b* and the base airfoil trailing edge 312*b*). The percentage of the span length 326 (e.g., span S) of the first airfoil 212 that exhibits the axial blade sweep is defined by a radial distance 328 between the airfoil tip 308*a* and the axis 324. The radial distance 328 is from greater than zero percent to forty percent of the span length 326 (e.g., span S). In some examples, the radial distance is from five percent to twenty-five percent of the span length 326 of the first airfoil 212. In some examples, the radial distance is twenty-five percent of the span length 326 of the first airfoil 212.

By combining the varying of the radius of the hub and thus the varying of the span of the airfoil with the axial sweep of the airfoil, frequency mistuning of the first airfoil 212 relative the second airfoil 214 can be achieved with lesser levels of variation in the hub radius and/or lesser levels in the amount of axial sweep. Furthermore, more effective mistuning of torsional and chordwise bending modes can also be achieved.

Figure 6B:
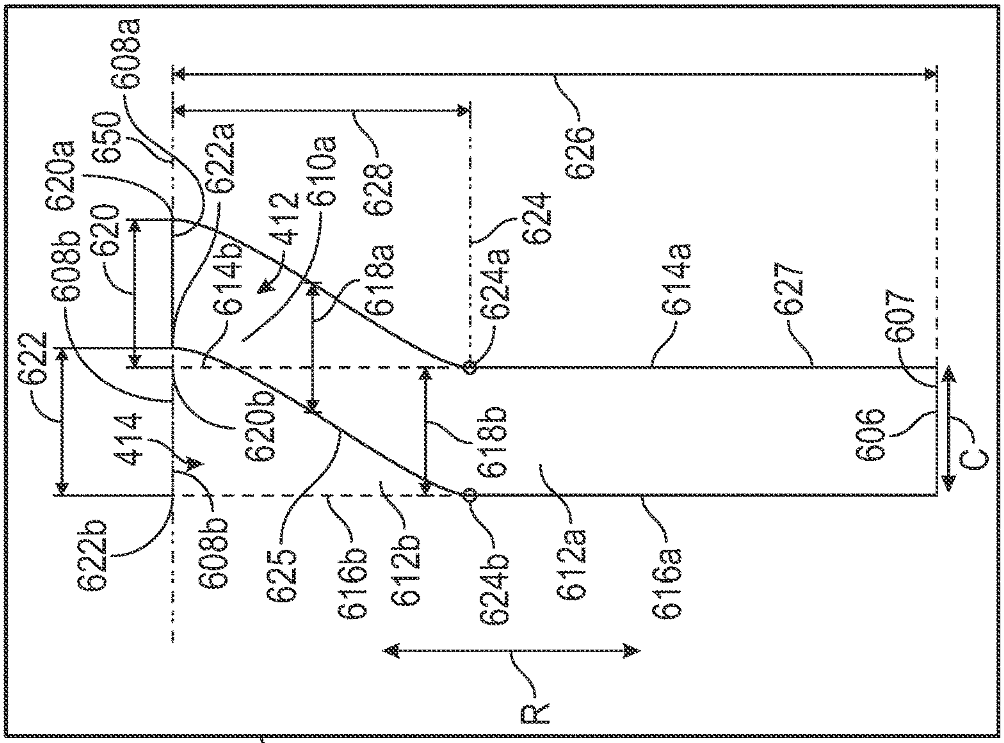
FIG. 6B shows an airfoil exhibiting tangential or circumferential sweep of a suction side or a pressure side in the circumferential direction, according to an embodiment of the present disclosure.
Figure 6A:
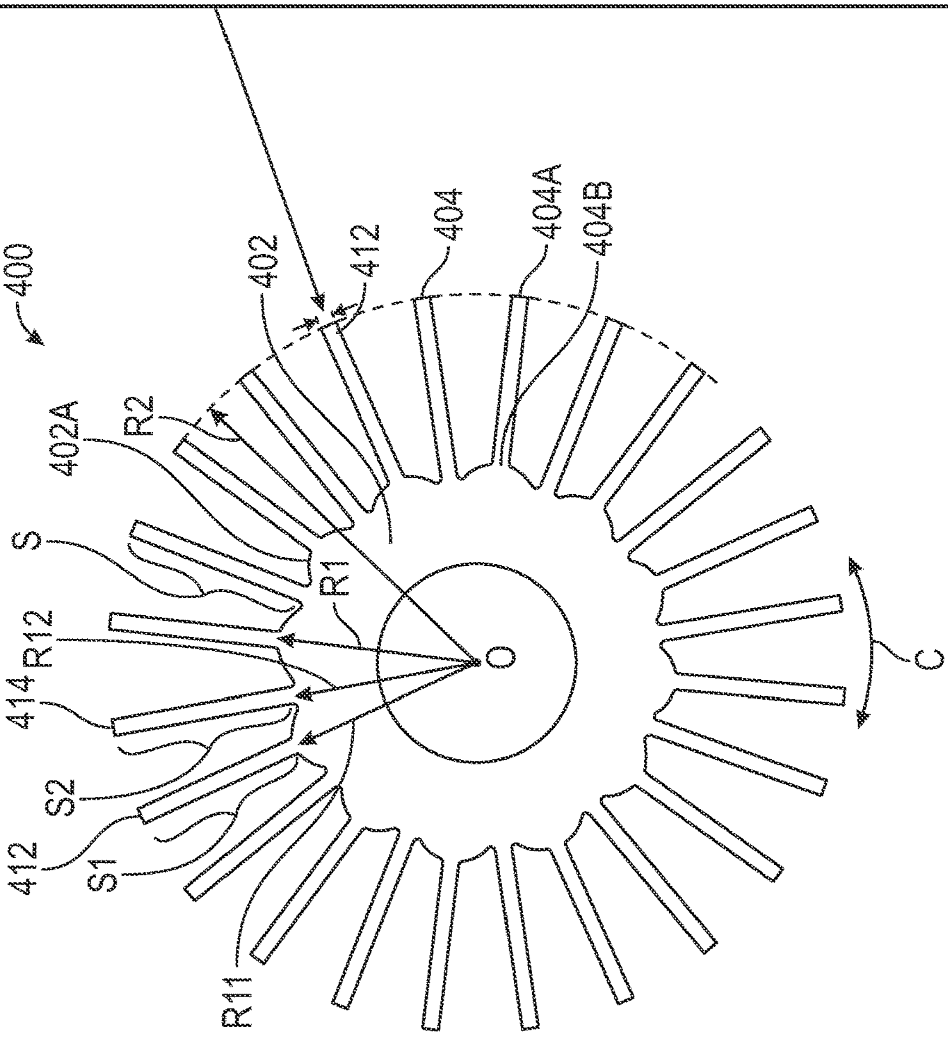
FIG. 6A is a schematic diagram of a front view an airfoil rotor hub system having a rotor hub and a plurality of airfoils (e.g., blades) connected thereto, at least one of the plurality of airfoils having a circumferential airfoil sweep, according to an embodiment of the present disclosure.

FIG. 6A is a schematic diagram of a front view an airfoil rotor hub system 400 having a rotor hub 402 and a plurality of airfoils 404 (e.g., blades) connected thereto, according to an embodiment of the present disclosure. The airfoil rotor hub system 400 has a plurality of airfoils 404 connected to surface 402A of the rotor hub 402. The plurality of airfoils 404 have a base 404B connected to the surface 402A and a tip 404A extending therefrom by a span S. In an embodiment, a radius R1 of the rotor hub 402 varies along the circumference C of the rotor hub 402.

As shown in FIG. 6A, a radius R2 of the airfoil rotor hub system 400 defined as a distance between the axis of rotation O (axial direction O) and the tip 404A of the airfoil 404 is substantially constant around a circumference C of the of the rotor hub 402. The radius R2 of the airfoil rotor hub system 400 is equal to a sum of the radius R1 of the rotor hub 402 and a span S of the plurality of airfoils 404 (R2=R1+S). In this embodiment, the radius R1 of the rotor hub 402 increases and decreases in an alternating fashion around the circumference C of the rotor hub 402. For example, as illustrated in FIG. 6A, the surface 402A of the rotor hub 402 has a zigzagged sinusoidal shape or a triangular shape. A first airfoil 412 is connected to a peak of the triangular shape or sinusoidal shape of the surface 402A and a second airfoil 414 adjacent the first airfoil 412 is connected to a trough of the sinusoidal shape or the triangular shape of the surface 402A. The first airfoil 412 has a first span S1 and the second airfoil 414 has a second span S2. The first span S1 of the first airfoil 412 is less than the second span S2 of the second airfoil 414.

Although the surface 402A of the rotor hub 402 is shown as having a zigzagged sinusoidal shape or a triangular shape, the surface 402A of the rotor hub 402 can also have other shapes such as a rounded scalloped shape, a trapezoid shape, etc. The main feature is to provide the surface 402A of the rotor hub 402 with a varying radius R1 and connecting two of the first airfoil 412 and the second airfoil 414 to two locations along the surface 402A having different radii. For example, the first airfoil 412 is connected to the surface 402A of the rotor hub 402 at a first radius R11 and the second airfoil 414 is connected to the surface 402A of the rotor hub 402 at a second radius R12, the second radius R12 being less than the first radius R11.

In an embodiment, the first airfoil 412 that is connected to a peak of the triangular shape or sinusoidal shape of the surface 402A and having the first span S1 has also a circumferential airfoil sweep at the tip of the airfoil in the circumferential direction (shown in FIG. 6B).

FIG. 6B shows an airfoil exhibiting tangential or circumferential sweep of a suction side or a pressure side in the circumferential direction, according to an embodiment of the present disclosure. That is, the airfoil exhibits a sweep in a direction of the circumference to extend into the inter-airfoil (between airfoils) spacing. As shown in FIG. 6B, the first airfoil 412 has an airfoil tip 608*a*, an airfoil root 606, a leading edge 610*a*, a trailing edge 612*a*, a pressure side 614*a*, and a suction side 616*a*. The suction side 616*a* is swept in the circumferential direction C (shown in FIG. 6B) in the direction of rotation of the turbine engine 10 (FIG. 1) or opposite to the direction of rotation of the engine 10 (FIG. 1). The circumferential sweep is in relation to the second airfoil 414 (base airfoil). The second airfoil 414 (base airfoil) has a base airfoil suction side 616*b*, a base airfoil pressure side 614*b*, a base airfoil trailing edge 612*b*, a base airfoil tip 608*b*, and a base airfoil root 607. The base airfoil tip 608*b* and the base airfoil root 607 are collinear with the airfoil tip 608*a* and the airfoil root 606, respectively. At the airfoil root 606, the leading edge and the trailing edge of each of the second airfoil 414 (base airfoil) and the first airfoil 412 are at the same axial location and there is no axial sweep.

The suction side 616*a* and the pressure side 614*a* are swept in the circumferential direction C in the direction of rotation of the turbine engine 10 (FIG. 1) or in the direction opposite the direction of rotation of the turbine. "Circumferential sweep," means that the suction side 616*a* or the pressure side 614*a* is circumferentially shifted in the direction of rotation of the turbine engine 10 (FIG. 1) or opposite to the direction of rotation of the turbine engine 10 (FIG. 1) as compared to the base airfoil suction side 616*b* or the base airfoil pressure side 614*b*, respectively. Likewise, a pressure side 614*a* is swept in the circumferential direction C in the direction of the rotation of the turbine engine 10 (FIG. 1) or opposite the direction of rotation of the turbine engine 10 (FIG. 1) as compared to the base airfoil pressure side 614*b*. The sweep of the suction side 616*a* and the pressure side 614*a* is such that a chord length is constant (e.g., within ten percent of) between the first airfoil 412 and the second airfoil 414 (base airfoil). In some examples, an airfoil thickness 618*a* defined between the suction side 616*a* and the pressure side 614*a* is within twenty-five percent of an airfoil thickness 618*b* defined between the base airfoil suction side 616*b* and the base airfoil pressure side 614*b*. In some examples, the airfoil thickness 618*a* is equal to the airfoil thickness 618*b*.

As shown in FIG. 6B, the suction side 616*a* is substantially collinear with respect to the base airfoil suction side 616*b* along a lower portion 627 of the first airfoil 412 and extends from the airfoil root 606 to a sweep point 624*b*. After the sweep point 624*b*, along an upper portion 625 of the suction side 616*a*, the suction side 616*a* is not collinear with respect to the base airfoil suction side 616*b*. Thus, the sweep point 624*b* defines a point at which the suction side 616*a* diverges from the base airfoil suction side 616*b*. Likewise, the pressure side 614*a* is substantially collinear with respect to the base airfoil pressure side 614*b* along a lower portion of the first airfoil 412 that extends from the airfoil root 606 to a sweep point 624*a*. After the sweep point 624*a* and extending from the sweep point 624*a* to the airfoil tip 608*a*, the pressure side 614*a* is not collinear with respect to the base airfoil pressure side 614*b*. Thus, the sweep point 624*a* defines a point at which the pressure side 614*a* diverges from the base airfoil pressure side 614*b*.

The circumferential sweep of the suction side 616*a* and the pressure side 614*a* may extend from an axis 624 to the airfoil tip 608*a*. The axis 624 extends through the point at which the suction side 616*a* and the pressure side 614*a* are no longer swept and are collinear with the base airfoil suction side 616*b* and the base airfoil pressure side 614*b*, respectively. At the airfoil tip 608*a*, the amount that the suction side 616*a* is swept in the circumferential direction C is equal to a suction side circumferential sweep 622. The suction side circumferential sweep 622 is defined between a suction side tip edge 622*a* and a base airfoil suction side tip edge 622*b*. The suction side tip edge 622*a* is a substantially axially extending edge of the airfoil tip 608*a* at the suction side 616*a* and the base airfoil suction side tip edge 622*b* is a substantially axially extending edge of the base airfoil tip 608*b* at the base airfoil suction side 616*b*. By "substantially axially" it is meant that the edge extends more in the axially direction than in either of the radial or circumferential directions. Similarly, at the airfoil tip 608*a*, the amount that the pressure side 614*a* is swept in the circumferential direction C is equal to a pressure side circumferential sweep 620. The pressure side circumferential sweep 620 is defined between a pressure side tip edge 620*a* and a base airfoil pressure side tip edge 620*b*. The pressure side tip edge 620*a* is a substantially axially extending edge of the airfoil tip 608*a* at the pressure side 614*a* and the base airfoil pressure side tip edge 620*b* is a substantially axially extending edge of the base airfoil tip 608*b* at the base airfoil pressure side 614*b*.

The suction side circumferential sweep 620 and the pressure side circumferential sweep 622 may be equal. The suction side circumferential sweep 620 is from greater than zero percent to twenty-five percent of the pitch. The pressure side circumferential sweep 622 is from greater than zero percent to twenty-five percent of the pitch. In some examples, the suction side circumferential sweep 620 or the pressure side circumferential sweep 622, or both, is from two percent to ten percent. The pitch is the inter-blade spacing defined as the distance between adjacent first airfoil 412 at the respective airfoil tips. Thus, the sweep is a percentage of the inter-blade spacing between the first airfoil 412 and the adjacent second airfoil 414 upstream or downstream (depending on the direction of sweep). Adjacent means two rotor blades with no intervening rotor blade therebetween.

A span length 626 (span S) is defined between the airfoil tip 608*a* and the airfoil root 606. The percentage of the span length 626 of the first airfoil 412 that exhibits the axial blade sweep is defined by a radial distance 628. The radial distance 628 is defined between the airfoil tip 608*a* and the axis 624. The radial distance 628 is from greater than zero percent to forty percent of the span length 626. In some examples, the radial distance is from five percent to twenty-five percent of the span length of the first airfoil 412. In some examples, the radial distance is twenty-five percent of the span length of the first airfoil 412.

In another embodiment the direction of the circumferential sweep can be reversed such that the suction side 616*a* and the pressure side 614*a* of the first airfoil 412 are swept in the circumferential direction C in the opposite direction of rotation of the turbine engine 10 (FIG. 1).

By combining the varying of the radius of the rotor hub 402 and thus the varying of the span of the airfoils 404 with the axial circumferential sweep of the airfoils 404, frequency mistuning of the first airfoil 412 relative the second airfoil 414 can be achieved with lesser levels of variation in the hub radius and/or lesser levels in the amount of circumferential sweep.

In an embodiment, an axial aft sweep or an axial forward sweep and a circumferential sweep in the direction of rotation or opposite the direction of rotation of the turbine engine 10 can also be used in combination with the varying radius of the hub to provide further control in frequency mistuning.

Figure 7B:
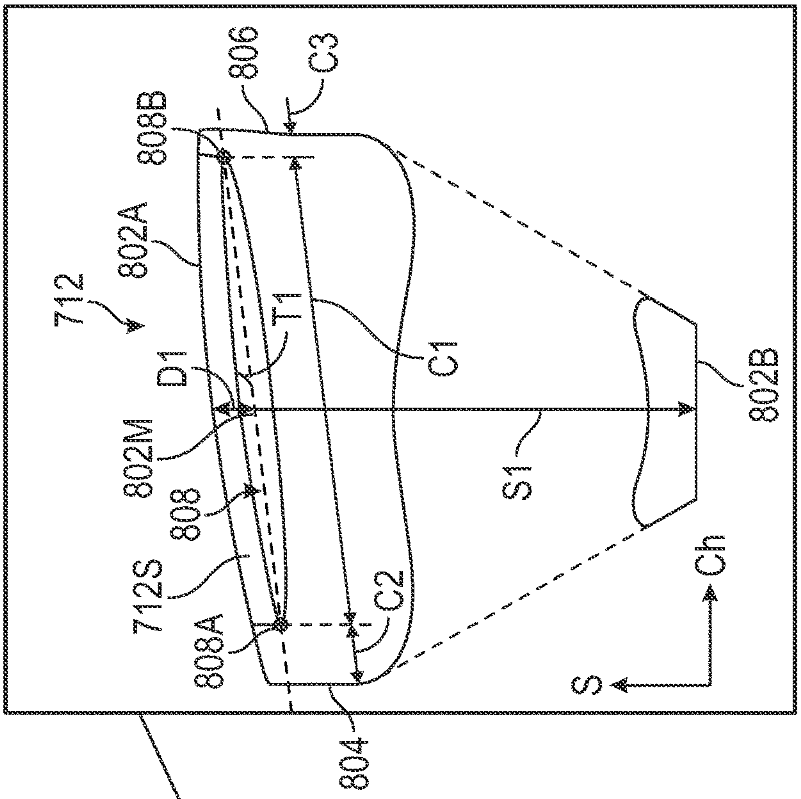
FIG. 7B is a schematic representation of a first airfoil having the mistuning feature, according to an embodiment of the present disclosure.
Figure 7A:
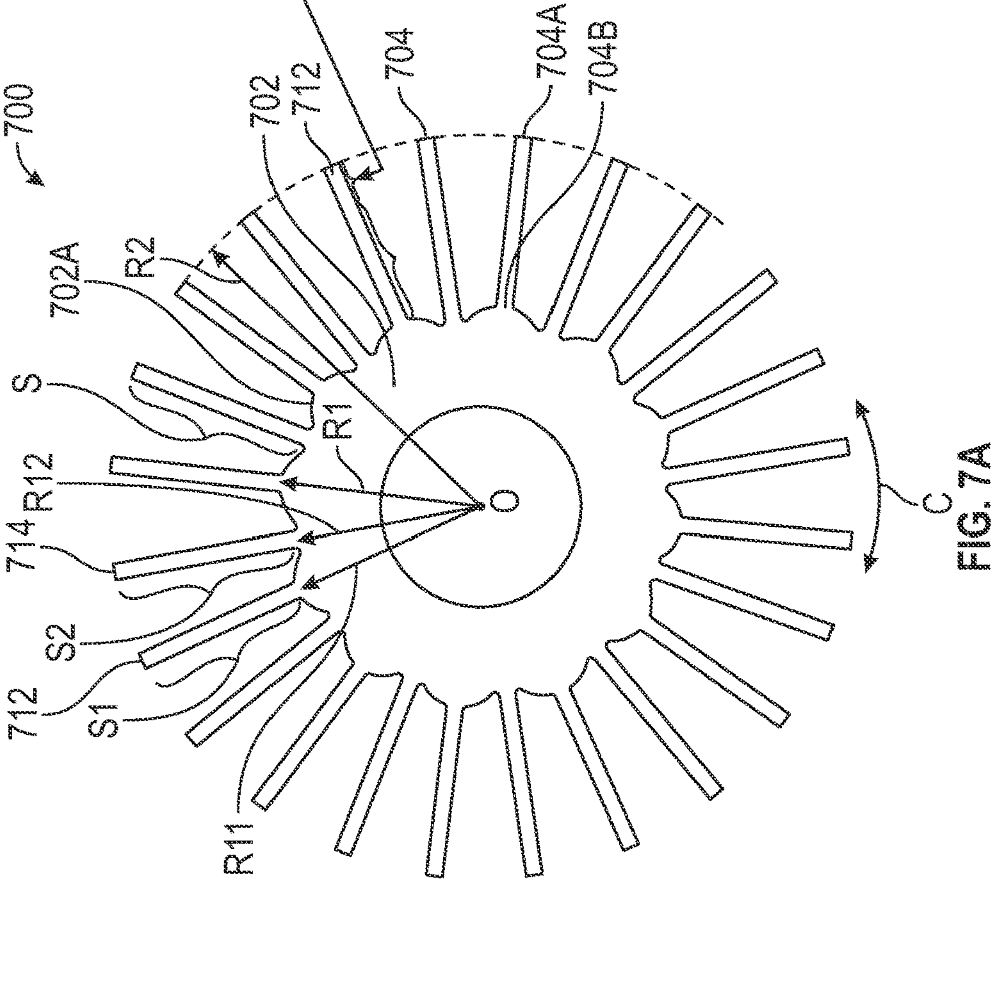
FIG. 7A is a schematic diagram of a front view an airfoil rotor hub system having a rotor hub and a plurality of airfoils (e.g., blades) connected thereto, at least one of the plurality of airfoils having a mistuning feature (e.g., a notch or a squealer tip), according to an embodiment of the present disclosure.

FIG. 7A is a schematic diagram of a front view an airfoil rotor hub system 700 having a rotor hub 702 and a plurality of airfoils 704 (e.g., blades) connected thereto, according to an embodiment of the present disclosure. The airfoil rotor hub system 400 has a plurality of airfoils 704 connected to surface 702A of the rotor hub 702. The plurality of airfoils 704 have a base 704B connected to the surface 702A and a tip 704A extending therefrom by a span S. In an embodiment, a radius R1 of the rotor hub 702 varies along the circumference C of the rotor hub 702.

As shown in FIG. 7A, a radius R2 of the airfoil rotor hub system 700 defined as a distance between the axis of rotation O (axial direction O) and a tip 704A of the airfoil 704 is substantially constant around a circumference C of the of the rotor hub 702. The radius R2 of the airfoil rotor hub system 700 is equal to a sum of the radius R1 of the rotor hub 702 and a span S of the plurality of airfoils 704 (R2=R1+S). In this embodiment, the radius R1 of the rotor hub 702 increases and decreases in an alternating fashion around the circumference C of the rotor hub 702. For example, as illustrated in FIG. 7A, the surface 702A of the rotor hub 402 has a zigzagged sinusoidal shape or a triangular shape. A first airfoil 712 is connected to a peak of the triangular shape or sinusoidal shape of the surface 702A and a second airfoil 714 adjacent the first airfoil 712 is connected to a trough of the sinusoidal shape or the triangular shape of the surface 702A. The first airfoil 712 has a first span S1 and the second airfoil 714 has a second span S2. The first span S1 of the first airfoil 712 is less than the second span S2 of the second airfoil 714.

Although the surface 702A of the rotor hub 702 is shown as having a zigzagged sinusoidal shape or a triangular shape, the surface 702A of the rotor hub 702 can also have other shapes such as a rounded scalloped shape, a trapezoid shape, etc. The main feature is to provide the surface 702A of the rotor hub 402 with a varying radius R1 and connecting two of the first airfoil 712 and the second airfoil 714 to two locations along the surface 702A having different radii. For example, the first airfoil 712 is connected to the surface 702A of the rotor hub 402 at a first radius R11 and the second airfoil 714 is connected to the surface 702A of the rotor hub 702 at a second radius R12, the second radius R12 being less than the first radius R11.

In an embodiment, the first airfoil 712 that is connected to a peak of the triangular shape or sinusoidal shape of the surface 702A and having the first span S1 has also a notch (squealer tip) in the vicinity of the tip of the first airfoil 712.

FIG. 7B is a schematic representation of the first airfoil 712 having a notch, according to an embodiment of the present disclosure. The first airfoil 712 is defined by a span in a spanwise direction S and a chord C in a chordwise direction Ch. The span of the first airfoil 712 is defined from a tip 802A of the first airfoil 712 to a base 802B of the first airfoil 712. The chord of the first airfoil 712 is defined from a leading edge 804 (LE) of the first airfoil 712 to a trailing edge 806 (TE) of the first airfoil 712. In some examples, the chord of the first airfoil 712 varies along the span of the first airfoil 712.

As shown in FIG. 7B, the first airfoil 712 includes a mistuning feature 808 (e.g., a notch). Intentional mistuning of the first airfoil 712 can further be achieved by one or more mistuning features, as detailed further below, for natural frequency mistuning and/or for mode shape mistuning of the first airfoil 712 (referred to as intentionally mistuned airfoil) relative to the baseline natural frequencies and/or the baseline mode shapes of the second airfoil 714 (referred to as base airfoil), shown in FIG. 7A. For example, the mistuning feature 808 may control the vibration frequencies and/or the mode shapes of the first airfoil 712 (intentionally mistuned airfoil) relative to the baseline natural vibration frequencies and/or the baseline mode shapes of the second airfoil 714 (base airfoil).

The mistuning feature 808 may be located on the first airfoil 712 at a spanwise location S1. For example, the spanwise location S1 of the mistuning feature 808 can be measured from the base 802B of the first airfoil 712 to the tip 802A of the first airfoil 712. The location of the mistuning feature 808 can also be measured by a depth dimension D1 measured from the tip 802A of the first airfoil 712 to the mid-point 802M of the mistuning feature 808. For example, the depth dimension D1 measured from the tip 802A to the mid-point 802M of the mistuning feature 808 can be between zero percent (0%) and forty percent (40%) of a total span from the tip 802A to the base 802B of the first airfoil 712.

Therefore, the location of the mistuning feature 808 on the first airfoil 712 is defined by a depth dimension D1 in the radial direction. The location of the mistuning feature 808 on the first airfoil 712 is also defined by a width dimension C1 in a direction of the chord C of the first airfoil 712. The width dimension C1 is a percentage of the chord of the first airfoil 712. The depth dimension D1 is a percent of the span of the first airfoil 712.

In one embodiment, a first end 808A of the mistuning feature 808 is located at a first distance C2 from the leading edge 804 (LE) of the first airfoil 712 and a second end 808B of the mistuning feature 808 is located at second distance C3 from the trailing edge 806 (TE) of the first airfoil 712. In an embodiment, the mistuning width dimension C1 can be centered within the chord of the first airfoil 712 such that, for example, the first distance C2 of the first end 808A of the mistuning feature 808 relative to the leading edge 804 is substantially equal to the second distance C3 of the second end 808B of the mistuning feature 808 relative to the trailing edge 806.

In an embodiment, the mistuning feature 808 has a thickness dimension T1. The thickness dimension T1 is perpendicular to a surface 712S of the first airfoil 712. In an embodiment, the thickness dimension T1 of the mistuning feature 808 corresponds to material removed from the first airfoil 712. Therefore, in this embodiment, the mistuning feature 808 includes a notch formed inside the surface 712S. The mistuning feature 808 is located at the vicinity of the tip 802A of the first airfoil 712. In an embodiment, the thickness dimension T1 of the mistuning feature 808 can be greater that zero percent (0%), for example, from zero percent (0%) to forty percent (40%), of a full thickness of the first airfoil 712, the full thickness being measured from the surface 712S to an opposite surface (not shown) of the first airfoil 712.

The parametric relationship between geometric characteristics of the mistuning feature 808 is determined such that the mistuning feature 808 generates at least 1% frequency difference from the nominal natural frequency of the airfoil without the mistuning feature 808. In other words, a ratio Ra of natural frequency $W_{sq}$ of the airfoil with the mistuning feature 808 to the frequency W of the airfoil without the mistuning feature 808 is greater than or equal to 1.01 (i.e., $W_{sq}/W \geq 1.01$). This ratio R can be expressed by the following equation.

$$Ra = \frac{\sqrt{\frac{k}{m_{sq}}}}{\sqrt{\frac{k}{m}}} \geq 1.01 \tag{1}$$

where mass m=ρLCt, and mass $$m_{sq} = \rho(LCt - C_{sq}ht_{sq}) \tag{2}$$

where L is an average span dimension S1 of the intentionally mistuned airfoil 712, C is an average chord dimension, corresponding to the sum of C1, C2 and C3 (C=C1+C2+C3), of the intentionally mistuned airfoil 712, t is an average thickness dimension of the intentionally mistuned airfoil 712, $C_{sq}$ (corresponding to C1) is an average chord dimension of the mistuning feature 808, $t_{sq}$ (corresponding to T1) is an average thickness dimension of the mistuning feature 808, h (corresponding to D1) is a height or depth of the mistuning feature 808, p is a density of a material of the intentionally mistuned airfoil 712, k is a stiffness of the intentionally mistuned airfoil 712.

By replacing the mass m and mass $m_{sq}$ in equation (1) with respective equations (2), removing the square root, and simplifying, equation (3) is obtained.

$$Ra^2 = \frac{LCt}{LCt - C_{sq}ht_{sq}} \geq 1.0201 \tag{3}$$

In other words, a ratio of a first product of an average span dimension L, an average chord dimension C and an average thickness dimension T to a difference between the first product and a second product of an average chord dimension $C_{sq}$ of the mistuning feature, the average thickness dimension $t_{sq}$ of the mistuning feature and the height h of the mistuning feature is greater than or equal to approximately 1.02.

Therefore, the ratio Ra can be adjusted by selecting appropriate values for the variables in equation (3) including the average thickness dimension $t_{sq}$ of the mistuning feature 402, the height h of the mistuning feature 402, and the average chord dimension $C_{sq}$ of the mistuning feature 808.

In an embodiment, the first intentionally mistuned airfoils 712 are mistuned from the baseline airfoils 714 to break the self-excited fluid structure interactions. The first intentionally mistuned airfoils 712 may include a reduced aerodynamic performance as compared to the baseline airfoils 714 in order to achieve the intentionally mistuning. For example, "ABAB" pattern allows for a balance between separating the natural frequencies and/or the mode shapes between the baseline airfoils 714 and the first intentionally mistuned airfoils 712, and aerodynamic performance of the rotor blade system 700.

In an embodiment, the airfoil distribution pattern includes a second pattern P2. The second pattern P2 includes an "AABAAB" pattern in which one first intentionally mistuned airfoil 712 is disposed between two consecutive baseline airfoils 714. The "AABAAB" pattern provides for increased aerodynamic performance, but reduced flutter mitigation, as compared to the "ABAB" pattern. For example, the more baseline airfoils 714 there are, the more aerodynamic performance of the rotor blade system 700. The fewer first intentionally mistuned airfoils 712 there are, however, the less mechanical damping is provided to mitigate the flutter.

In another embodiment, the airfoil distribution pattern includes a third pattern P3. The third pattern P3 includes an "AAABAAAB" pattern in which one first intentionally mistuned airfoil 712 is disposed between three consecutive baseline airfoils 714. The "AAABAAAB" pattern provides for increased aerodynamic performance, but reduced flutter mitigation, as compared to the "ABAB" pattern and to the "AABAAB" pattern.

In a further embodiment, the airfoil distribution pattern includes a fourth pattern P4. The fourth pattern P4 includes an "ABC" pattern where "B" is a first intentionally mistuned airfoil 712 having a first mistuning feature, and "C" is a second intentionally mistuned airfoil 712 having a second mistuning feature that is different than the first mistuning feature (e.g., a different mistuning feature and/or a different location of the mistuning feature on the second intentionally mistuned airfoil 712 as compared to the first intentionally mistuned airfoil 712).

For example, the "ABC" pattern provides for increased flutter mitigation as compared to the first airfoil distribution pattern P1, the second airfoil distribution pattern P2, and the third airfoil distribution pattern P3. In addition, the second intentionally mistuned airfoil 712 provides for an additional degree of freedom to improve tuning of the pattern of airfoils to a specific flutter mode. In some examples, other patterns of the airfoil distribution pattern may include second intentionally mistuned airfoils 712 (e.g., in an "AABC" pattern, in an "AABBC" pattern, in an "ABCC" pattern, or the like). The airfoil distribution pattern is selected from the group consisting of P1, P2, P3, P4, or a combination thereof. For example, the airfoil distribution pattern is selected from the group consisting of repeating patterns of AB, AAB, AAAB, ABC, AABC, AABBC, ABCC, or combinations thereof.

By combining the varying of the radius of the rotor hub 702 and the varying of the span of the airfoils 704 with the mistuning feature 808 (e.g., the notch or squealer tip) in the vicinity of the tip 802A of the first airfoil 712, frequency mistuning of the first airfoil 712 relative the second airfoil 714 can be achieved with lesser levels of variation in the hub radius and/or lesser levels in amount of mistuning features (e.g., a number of mistuning features or depth and/or thickness of the mistuning features). This combination of features further improves rotor-to-stator rub characteristics of the airfoils. One benefit of providing a thin squealer tip is that, for a given amount of radial interference or contact between the airfoil tip and the case, less material is removed. As a result, less energy is required to remove the interfering or contact material and subsequently less damaging localized heat may be generated.

In the above embodiments depicted in FIGS. 5A and 5B, 6A and 6B, and 7A and 7B, the features circumferential sweep, axial sweep and squealer tip or notch of the airfoil are shown combined with a variable radius hub configuration similar to the configuration shown in FIG. 2. However, the same features circumferential sweep, axial sweep and squealer tip or notch of the airfoil can also be combined with a variable radius hub configuration similar to the configuration shown in FIG. 3 or FIG. 4. In addition, any one or more of the embodiments shown in FIGS. 5A and 5B, 6A and 6B, and 7A and 7B can be used in combination. For example, a first airfoil may have the features shown in FIGS. 5A and 5B, a second airfoil may have the configuration shown in FIGS. 6A and 6B, and a third airfoil may have the configuration shown in FIGS. 7A and 7B.

Further aspects are provided by the subject matter of the following clauses.

As can be appreciated from the discussion above, an airfoil rotor hub system includes a rotor hub, the rotor hub having a variable radius around a circumference of the rotor hub, and a plurality of airfoils connected to the rotor hub, a first airfoil in the plurality of airfoils having a first span connected to a surface of the rotor hub at a first radius, and a second airfoil in the plurality of airfoils having a second span connected to the surface of the rotor hub at a second radius. The first radius is different from the second radius, and the first span of the first airfoil is different from the second span of the second airfoil so as to mistune a frequency of the first airfoil and the second airfoil to reduce or substantially to eliminate flutter in the plurality of airfoils.

The airfoil rotor hub system of the preceding clause, wherein the first airfoil is adjacent to the second airfoil.

The airfoil rotor hub system of any preceding clause, wherein the surface of the rotor hub has a zigzagged triangular shape, the first airfoil is connected to a peak of the zigzagged triangular shape of the surface of the rotor hub, and the second airfoil is connected to a trough of the zigzagged triangular shape of the surface of the rotor hub.

The airfoil rotor hub system of any preceding clause, wherein the surface of the rotor hub has a rounded scalloped shape, a sinewave shape, or a trapezoid shape, the first airfoil is connected to a peak of the rounded scalloped shape, the sinewave shape, or the trapezoid shape of the surface of the rotor hub, and the second airfoil is connected to a trough of the rounded scalloped shape, the sinewave shape, or the trapezoid shape of the surface of the rotor hub.

The airfoil rotor hub system of any preceding clause, wherein the first span of the first airfoil is less than the second span of the second airfoil.

The airfoil rotor hub system of any preceding clause, wherein a first group of one or more successive airfoils in the plurality of airfoils have a same first span and a second group of one or more successive airfoils in the plurality of airfoils have a same second span different from the first span.

The airfoil rotor hub system of any preceding clause, wherein the plurality of airfoils are equally spaced circumferentially around the circumference of rotor hub.

The airfoil rotor hub system of any preceding clause, wherein the plurality of airfoils are unequally spaced circumferentially around the circumference of the rotor hub.

The airfoil rotor hub system of any preceding clause, wherein the airfoil rotor hub system has a radius defined as a distance between a rotation axis of the rotor hub and a tip of an airfoil in the plurality of airfoils, wherein the radius of the airfoil rotor hub system is equal to a sum of the radius of the rotor hub and a span of the plurality of the airfoils.

The airfoil rotor hub system of any preceding clause, wherein the radius of the airfoil rotor hub system is constant.

The airfoil rotor hub system of any preceding clause, wherein the radius of the airfoil rotor hub system is variable.

The airfoil rotor hub system of any preceding clause, wherein each of the plurality of airfoils has a leading edge, a trailing edge, a suction side, and a pressure side, and at least one airfoil of the plurality of airfoils has a leading edge axial sweep of the leading edge as compared to a leading edge of a base airfoil of the plurality of airfoils and a trailing edge axial sweep of the trailing edge as compared to a trailing edge of the base airfoil of the plurality of airfoils.

The airfoil rotor hub system of any preceding clause, wherein the leading edge axial sweep is equal to the trailing edge axial sweep.

The airfoil rotor hub system of any preceding clause, wherein the leading edge axial sweep and the trailing edge axial sweep extend in a forward direction of a turbine engine.

The airfoil rotor hub system of any preceding clause, wherein the leading edge axial sweep and the trailing edge axial sweep extend in an aft direction of the turbine engine.

The airfoil rotor hub system of any preceding clause, wherein the at least one airfoil includes an airfoil tip and an airfoil root, and the base airfoil includes a base airfoil tip and a base airfoil root, and there is an overlap between the airfoil tip and the base airfoil tip.

The airfoil rotor hub system of any preceding clause, wherein the at least one airfoil of the plurality of airfoils includes an airfoil tip and an airfoil root, and the base airfoil includes a base airfoil tip and a base airfoil root, and there is no overlap between the airfoil tip and the base airfoil tip.

The airfoil rotor hub system of any preceding clause, wherein the at least one airfoil of the plurality of airfoils further includes a circumferential sweep in an inter-airfoil spacing defined between the at least one airfoil of the plurality of airfoils and an adjacent airfoil of the plurality of airfoils.

The airfoil rotor hub system of any preceding clause, wherein a pitch is defined between an airfoil tip of adjacent airfoils of the plurality of airfoils, and the circumferential sweep is from greater than zero percent to twenty-five percent of the pitch.

The airfoil rotor hub system of any preceding clause, wherein the at least one airfoil defines a chord length between the leading edge and the trailing edge, and wherein the leading edge axial sweep or the trailing edge axial sweep is from greater than zero percent to fifteen percent of the chord length.

The airfoil rotor hub system of any preceding clause, wherein the leading edge axial sweep or the trailing edge axial sweep is from five percent to ten percent of the chord length.

The airfoil rotor hub system of any preceding clause, wherein the at least one airfoil defines a span length between an airfoil tip and an airfoil root, and the leading edge axial sweep or the trailing edge axial sweep is from greater than zero percent to forty percent of the span length.

The airfoil rotor hub system of any preceding clause, wherein the leading edge axial sweep or the trailing edge axial sweep is from five percent to twenty-five percent of the span length.

The airfoil rotor hub system of any preceding clause, wherein the at least one airfoil defines a chord length between the leading edge and the trailing edge, the base airfoil defines a base airfoil chord length between a leading edge of the base airfoil and a trailing edge of the base airfoil, and the chord length is within ten percent of the base airfoil chord length.

The airfoil rotor hub system of any preceding clause, wherein the chord length is equal to the base airfoil chord length.

The airfoil rotor hub system of any preceding clause, further including a circumferential sweep, wherein the circumferential sweep is in a direction of rotation of a turbine engine.

The airfoil rotor hub system of any preceding clause, further including a circumferential sweep, wherein the circumferential sweep is in a direction opposite of rotation of the turbine engine.

The airfoil rotor hub system of any preceding clause, further including a circumferential sweep, and wherein the leading edge axial sweep and the trailing edge axial sweep are in a forward direction of the turbine engine and the circumferential sweep is in a direction of rotation of the turbine engine.

The airfoil rotor hub system of any preceding clause, further including a circumferential sweep, and wherein the leading edge axial sweep and the trailing edge axial sweep are in a forward direction of the turbine engine and the circumferential sweep is in a direction opposite of rotation of the turbine engine.

The airfoil rotor hub system of any preceding clause, further including a circumferential sweep, and wherein the leading edge axial sweep and the trailing edge axial sweep are in an aft direction of the turbine engine and the circumferential sweep is in a direction of rotation of the turbine engine.

The airfoil rotor hub system of any preceding clause, further including a circumferential sweep, and wherein the leading edge axial sweep and the trailing edge axial sweep are in an aft direction of the turbine engine and the circumferential sweep is in a direction opposite of rotation of the turbine engine.

The airfoil rotor hub system of any preceding clause, wherein the circumferential sweep is from greater than zero percent to forty percent of the span length.

The airfoil rotor hub system of any preceding clause, wherein the circumferential sweep is from five percent to twenty-five percent of the span length.

The airfoil rotor hub system of any preceding clause, wherein the circumferential sweep is from two percent to ten percent of the pitch.

The airfoil rotor hub system of any preceding clause, wherein the at least one airfoil includes an airfoil tip and an airfoil root, the base airfoil includes a base airfoil tip and a base airfoil root, and the airfoil tip and the airfoil root are coplanar with the base airfoil tip and the base airfoil root, respectively.

The airfoil rotor hub system of any preceding clause, wherein there is no sweep at the airfoil root.

The airfoil rotor hub system of any preceding clause, wherein the at least one airfoil defines an airfoil thickness between the leading edge and the trailing edge, the base airfoil defines a base airfoil thickness length between a leading edge of the base airfoil and a trailing edge of the base airfoil, and the airfoil thickness is within twenty-five percent of the base airfoil thickness.

The airfoil rotor hub system of any preceding clause, wherein the airfoil thickness is equal to the base airfoil thickness.

The airfoil rotor hub system of any preceding clause, further including a sweep point on the leading edge, wherein the leading edge axial sweep occurs from the sweep point to the airfoil tip and wherein the leading edge of the at least one airfoil and a leading edge of the base airfoil are collinear from the sweep point to the airfoil root.

The airfoil rotor hub system of any preceding clause, further including a sweep point on the trailing edge, wherein the trailing edge axial sweep occurs from the sweep point to the airfoil tip and wherein the trailing edge of the at least one airfoil and a trailing edge of the base airfoil are collinear from the sweep point to the airfoil root.

The airfoil rotor hub system of any preceding clause, further including a radial distance extending from an airfoil tip to a sweep point defining a point at which the leading edge axial sweep ceases and the leading edge of the at least one airfoil is collinear with a leading edge of the base airfoil.

The airfoil rotor hub system of any preceding clause, wherein the radial distance is from greater than zero percent to forty percent of the span length of the at least one airfoil.

The airfoil rotor hub system of any preceding clause, wherein the radial distance is five percent to twenty five percent of the span length of the last one airfoil.

The airfoil rotor hub system of any preceding clause, wherein the at least one airfoil has a span from a base of the at least one airfoil to a tip of the at least one airfoil and a chord defined from a leading edge of the at least one airfoil to a trailing edge of the at least one airfoil, and the at least one airfoil includes a mistuning feature, the mistuning feature including a notch formed inside a surface of the at least one airfoil, the mistuning feature being located at a vicinity of the tip of the at least one airfoil to generate a vibration frequency difference between a vibration frequency of the at one airfoil and a baseline natural vibration frequency of one or more base airfoil.

The airfoil rotor hub system of any preceding clause, wherein the mistuning feature is located at a depth dimension measured from the tip of the at least one airfoil to a mid-point of the mistuning feature.

The airfoil rotor hub system of any preceding clause, wherein the mistuning feature is defined by a width dimension in a direction of the chord of the at least one airfoil.

The airfoil rotor hub system of any preceding clause, wherein the mistuning feature is defined by a thickness dimension in a direction substantially perpendicular to the surface of the at least one airfoil, the thickness corresponding to material removed from the surface of the at least one airfoil to form the notch.

The airfoil rotor hub system of any preceding clause, wherein the thickness dimension of the mistuning feature is substantially constant along the width dimension of the mistuning feature.

The airfoil rotor hub system of any preceding clause, wherein the thickness dimension is variable along the width dimension of the mistuning feature such that the mistuning feature has a thickness dimension profile versus the width dimension that is sloped, curved, zigzagged, wavy, or any other selected shape, the thickness dimension profile being selected to generate the vibration frequency difference between the vibration frequency of the at least one airfoil and the baseline natural vibration frequency of the one or more base airfoil.

The airfoil rotor hub system of any preceding clause, wherein a ratio of the depth dimension to the thickness dimension is selected such that the vibration frequency difference between the vibration frequency of the at least one airfoil and the baseline natural vibration frequency of the one or more base airfoil is approximately from two percent (2%) to six percent (6%) of the baseline natural vibration frequency of the one or more base airfoil.

The airfoil rotor hub system of any preceding clause, wherein a ratio of a first product of an average span dimension, an average chord dimension and an average thickness dimension to a difference between the first product and a second product of an average chord dimension of the mistuning feature, the average thickness dimension of the mistuning feature and the height of the mistuning feature is greater than or equal to approximately 1.02.

The airfoil rotor hub system of any preceding clause, wherein the one or more base airfoil does not include the mistuning feature.

The airfoil rotor hub system of any preceding clause, wherein the airfoil distribution pattern is selected from the group consisting of AB, AAB, AAAB, ABC, AABC, AABBC, ABCC, or any combination thereof, wherein A is a base airfoil, B is a first airfoil with a first mistuning feature, and C is a second airfoil with a second mistuning feature different than the first mistuning feature.

The airfoil rotor hub system of any preceding clause, wherein a parametric relationship between geometric characteristics of the mistuning feature is determined such that the mistuning feature generates at least one percent (1%) frequency difference from a nominal natural frequency of the airfoil without the mistuning feature.

The airfoil rotor hub system of any preceding clause, wherein a ratio of natural frequency of the at least one airfoil with the mistuning feature to the nominal natural frequency of the base airfoil without the mistuning feature is greater than or equal to 1.01.

A turbine engine comprising the airfoil rotor hub system of any preceding clause.

Another aspect of the present disclosure is to provide a turbine engine including an airfoil rotor hub system having a rotor hub, the rotor hub having a variable radius around a circumference of the rotor hub, and a plurality of airfoils connected to the rotor hub, a first airfoil in the plurality of airfoils having a first span connected to a surface of the rotor hub at a first radius, and a second airfoil in the plurality of airfoils having a second span connected to the surface of the rotor hub at a second radius. The first radius is different from the second radius, and the first span of the first airfoil is different from the second span of the second airfoil so as to mistune a frequency of the first airfoil and the second airfoil to reduce or substantially eliminate flutter in the plurality of airfoils.

The turbine engine of the preceding clause, wherein the first airfoil is adjacent to the second airfoil.

The turbine engine of any preceding clause, wherein the surface of the rotor hub has a zigzagged triangular shape, wherein the first airfoil is connected to a peak of the zigzagged triangular shape of the surface of the rotor hub and the second airfoil is connected to a trough of the zigzagged triangular shape of the surface of the rotor hub.

The turbine engine of any preceding clause, wherein the surface of the rotor hub has a rounded scalloped shape, a sinewave shape, or a trapezoid shape, the first airfoil is connected to a peak of the rounded scalloped shape, the sinewave shape, or the trapezoid shape of the surface of the rotor hub, and the second airfoil is connected to a trough of the rounded scalloped shape, the sinewave shape, or the trapezoid shape of the surface of the rotor hub.

The turbine engine of any preceding clause, wherein the first span of the first airfoil is less than the second span of the second airfoil.

The turbine engine of any preceding clause, wherein a first group of one or more successive airfoils in the plurality of airfoils have a same first span and a second group of one or more successive airfoils in the plurality of airfoils have a same second span different from the first span.

The turbine engine of any preceding clause, wherein the plurality of airfoils are equally spaced circumferentially around the circumference of rotor hub.

The turbine engine of any preceding clause, wherein the plurality of airfoils are unequally spaced circumferentially around the circumference of the rotor hub.

The turbine engine of any preceding clause, wherein the airfoil rotor hub system has a radius defined as a distance between a rotation axis of the rotor hub and a tip of an airfoil in the plurality of airfoils, wherein the radius of the airfoil rotor hub system is equal to a sum of the radius of the rotor hub and a span of the plurality of the airfoils.

The turbine engine of any preceding clause, wherein the radius of the airfoil rotor hub system is constant.

The turbine engine of any preceding clause, wherein the radius of the airfoil rotor hub system is variable.

Although the foregoing description is directed to the preferred embodiments of the present disclosure, other variations and modifications will be apparent to those skilled in the art, and may be made without departing from the disclosure. Moreover, features described in connection with one embodiment of the present disclosure may be used in conjunction with other embodiments, even if not explicitly stated above.

We claim:

1. An airfoil rotor hub system comprising:

a rotor hub having a variable radius around a circumference of the rotor hub such that a surface of the rotor hub has a variable shape around the circumference of the rotor hub, the rotor hub being a single structure; and a plurality of airfoils connected to the rotor hub, a first airfoil in the plurality of airfoils having a first base connected to the surface of the rotor hub and a first tip extending therefrom by a first span, the first base of the first airfoil is connected to the surface of the rotor hub at a first radius, and a second airfoil in the plurality of airfoils having a second base connected to the surface of the rotor hub and a second tip extending therefrom by a second span, the second base of the second airfoil is connected to the surface of the rotor hub at a second radius, wherein the first radius is different from the second radius, and the first span of the first airfoil is different from the second span of the second airfoil so as to mistune a frequency of the first airfoil and the second airfoil to reduce or substantially to eliminate flutter in the plurality of airfoils.

2. The airfoil rotor hub system according to claim 1, wherein the first airfoil is adjacent to the second airfoil.

3. The airfoil rotor hub system according to claim 1, wherein the surface of the rotor hub has a rounded scalloped shape, or a sinewave shape, the first airfoil is connected to a peak of the rounded scalloped shape, or the sinewave shape of the surface of the rotor hub, and the second airfoil is connected to a trough of the rounded scalloped shape, or the sinewave shape of the surface of the rotor hub.

4. The airfoil rotor hub system according to claim 1, wherein the first span of the first airfoil is less than the second span of the second airfoil.

5. The airfoil rotor hub system according to claim 1, wherein the plurality of airfoils are equally spaced circumferentially around the circumference of the rotor hub.

6. The airfoil rotor hub system according to claim 1, wherein the airfoil rotor hub system has a radius defined as a distance between a rotation axis of the rotor hub and a tip of an airfoil in the plurality of airfoils, and the radius of the airfoil rotor hub system is equal to a sum of the radius of the rotor hub and a span of the plurality of the airfoils.

7. A turbine engine comprising:

an airfoil rotor hub system comprising:

a rotor hub having a variable radius around a circumference of the rotor hub such that a surface of the rotor hub has a variable shape around the circumference of the rotor hub, the rotor hub being a single structure; and a plurality of airfoils connected to the rotor hub, a first airfoil in the plurality of airfoils having a first base connected to the surface of the rotor hub and a first tip extending therefrom by a first span, the first base of the first airfoil is connected to the surface of the rotor hub at a first radius, and a second airfoil in the plurality of airfoils having a second base connected to the surface of the rotor hub and a second tip extending therefrom by a second span, the second base of the second air foil is connected to the surface of the rotor hub at a second radius, wherein the first radius is different from the second radius, and the first span of the first airfoil is different from the second span of the second airfoil so as to mistune a frequency of the first airfoil and the second airfoil to reduce or substantially eliminate flutter in the plurality of airfoils.

8. The turbine engine according to claim 7, wherein the first airfoil is adjacent to the second airfoil.

9. The turbine engine according to claim 7, wherein the surface of the rotor hub has a rounded scalloped shape, or a sinewave shape, the first airfoil is connected to a peak of the rounded scalloped shape, or the sinewave shape of the surface of the rotor hub, and the second airfoil is connected to a trough of the rounded scalloped shape, or the sinewave shape of the surface of the rotor hub.

10. The turbine engine according to claim 7, wherein the first span of the first airfoil is less than the second span of the second airfoil.

11. The turbine engine according to claim 7, wherein the plurality of airfoils are equally spaced circumferentially around the circumference of rotor hub.

12. The turbine engine according to claim 7, wherein the airfoil rotor hub system has a radius defined as a distance between a rotation axis of the rotor hub and a tip of an airfoil in the plurality of airfoils, and the radius of the airfoil rotor hub system is equal to a sum of the radius of the rotor hub and a span of the plurality of the airfoils.

* * * * *